US008855420B2

(12) United States Patent
Berrani et al.

(10) Patent No.: US 8,855,420 B2
(45) Date of Patent: Oct. 7, 2014

(54) DESCRIPTOR DETERMINATION IN A MULTIMEDIA CONTENT

(75) Inventors: Sid Ahmed Berrani, Chantepie (FR); Nicolas Gengembre, Plechatel (FR)

(73) Assignee: France Telecom, Paris (FR)

( * ) Notice: Subject to any disclaimer, the term of this patent is extended or adjusted under 35 U.S.C. 154(b) by 49 days.

(21) Appl. No.: 13/263,591

(22) PCT Filed: Apr. 8, 2010

(86) PCT No.: PCT/FR2010/050676
§ 371 (c)(1),
(2), (4) Date: Nov. 15, 2011

(87) PCT Pub. No.: WO2010/116093
PCT Pub. Date: Oct. 14, 2010

(65) Prior Publication Data
US 2012/0051642 A1    Mar. 1, 2012

(30) Foreign Application Priority Data
Apr. 9, 2009 (FR) ...................................... 09 52323

(51) Int. Cl.
*G06K 9/34* (2006.01)
(52) U.S. Cl.
USPC ......................................................... 382/180
(58) Field of Classification Search
CPC ....................................................... G06T 7/403
See application file for complete search history.

(56) References Cited

U.S. PATENT DOCUMENTS

| 6,199,084 B1 * | 3/2001 | Wiseman ...................... 708/304 |
| 2004/0012544 A1 * | 1/2004 | Swaminathan et al. ......... 345/32 |
| 2009/0052775 A1 * | 2/2009 | Moon et al. .................... 382/167 |

OTHER PUBLICATIONS

Tori Maenpaa, "The local binary pattern approach to texture analysis—extensions and applications", Academic Dissertation Presented with the Assent of the Faculty of Technology, Aug. 8, 2003, pp. 33-45, Oulu, Finland.
Zabih R et al., "Non-parametric Local Transforms for Computing Visual Correspondence", European Conference on Computer Vision, Jan. 1, 1994, pp. 151-158, vol. 2, Berlin, Germany.
Froba B et al., "Face Detection with the Modified Census Transform", Automatic Face and Gesture Recognition, 2004. Proceedings. Sixth IEEE International Conference on IEEE, May 17, 2004, pp. 91-96, Piscataway, NJ.
David G Lowe, "Distinctive Image Features from Scale-Invariant Keypoints", International Journal of Computer Vision, Kluwer Academic Publishers, BO, Nov. 1, 2004, pp. 91-110, vol. 60, No. 2.

(Continued)

*Primary Examiner* — Bhavesh Mehta
*Assistant Examiner* — Feng Niu
(74) *Attorney, Agent, or Firm* — David D. Brush; Westman, Champlin & Koehler, P.A.

(57) ABSTRACT

A method and apparatus are provided for determining a descriptor for a region of interest in an image. The method includes defining a grid of points for the region of interest. A respective zone of influence is associated with each point of the grid of points. A representative value is determined for each point of the grid of points as a function of its respective zone of influence. The representative value obtained for each point of the grid of points is compared with at least one reference value. The result of the comparison serves to define a descriptor for the region of interest.

8 Claims, 4 Drawing Sheets

(56) References Cited

OTHER PUBLICATIONS

Gengembre N et al., "Adaptive similarity search in large databases—application to image/video copy detection", Content-based Multimedia Indexing, 2008, International Worskshop ON, IEEE, Jun. 18, 2008, pp. 496-503, Piscataway, NJ.

Mikolajczyk K et al., "A Performance Evaluation of Local Descriptors", IEEE Transactions on Pattern Analysis and Machine Intelligence, IEEE Service Center, Oct. 1, 2005, pp. 1615-1630, vol. 27, No. 10, Los Alamitos, CA, USA.

International Search Report dated Jul. 9, 2010 from International Application No. PCT/FR2010/050676, filed Apr. 8, 2010.

* cited by examiner

DESCRIPTOR DETERMINATION IN A MULTIMEDIA CONTENT

CROSS-REFERENCE TO RELATED APPLICATIONS

This Application is a Section 371 National Stage Application of International Application No. PCT/FR2010/050676, filed Apr. 8, 2010 and published as WO 2010/116093 on Oct. 14, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of transmitting or exchanging multimedia contents. The term "multimedia content" is used to mean text, sound (or audio), images, video, or indeed any combination of these various elements.

More precisely, the disclosure relates to descriptor determination in a multimedia content that includes an image or a set of images or a video, in particular for the purpose of analyzing and monitoring such contents, e.g. for the purpose of detecting copies of a reference content.

BACKGROUND OF THE DISCLOSURE

The increase in the storage capacity of terminals and in the transmission rates in telecommunications networks has lead to the emergence of new services that facilitate consumption of multimedia contents.

Thus, content providers propose on-line services for downloading multimedia contents, which services are generally paid-for services. For contents that are protected by copyright, it is the content providers who ensure compliance.

Furthermore, the number of sites for exchanging contents where contents are made available on line by the users of those sites continues to increase. Some of those multimedia contents are created by the users themselves. Other contents comprise protected contents that are made available illegally for downloading.

It is therefore necessary to be able to detect illegal copies of a protected content.

In general, detecting copies of multimedia contents consists of searching for the presence or absence of a query content in a reference database of multimedia contents.

Such a database includes descriptors of reference multimedia contents. Conventionally, a descriptor is a numerical value or a set of numerical values characterizing a portion of the multimedia content. For example, when the multimedia content is a video, a descriptor may be defined for each of the images of the video or for a subset of them.

In order to search for the presence or absence of a query content in the reference database, the first step is to calculate the descriptors for the query content. The calculation is performed in identical manner to the calculation that was performed to determine the descriptors in the reference database.

Thereafter, a search is made in the reference database to see whether it contains descriptors that are identical or similar to those calculated for the query content. If the result is positive, it can be deduced that the query content is a copy of the multimedia content for which the descriptors have been found in the reference database.

The quality and the effectiveness with which multimedia content copies are detected depends on the properties of the descriptors. They must be suitable for being calculated rapidly. They must facilitate searching in the reference database. Such descriptors must also make it possible to detect a copy, even if the query multimedia content has been subjected to large amounts of transformation compared with the reference multimedia content (such as for example a high degree of compression, a change of resolution, text or a logo being overlaid therein, etc.). Such transformations may be unintentional, e.g. such as transformations due to recording the content, to transcoding it, etc. Other transformations may be intentional, specifically to make illegally copied content difficult to detect.

When the multimedia content is an image, a set of images, or indeed a video, various types of descriptor can be defined.

Certain descriptors are calculated overall for an image.

Other descriptors are calculated for a portion of an image referred to as a region of interest. For a given image, several regions of interest may be identified and a respective descriptor may be calculated for each of them.

Descriptors for regions of interest in an image provide better performance than an overall descriptor of the image in terms of detecting copies of a video (or of an image or of a set of images) when the image has been subjected locally to high levels of transformation. The term "high levels of transformation" is used, for example, to cover partial masking, inserting a logo of large size, inserting a video in an original video, image cropping, etc. Even if certain regions of a video (or of an image or of a set of images) are completely missing or masked, the video remains identifiable because of the descriptors of the regions of interest that have been subjected to little or no transformation. An overall descriptor of a video (or of an image or of a set of images) is spoilt when it has been subjected to a high level of transformation.

In the article entitled "Feature extraction and a database strategy for video fingerprinting", Proceedings of the $5^{th}$ International Conference Recent Advances in Visual Information Systems, 2002, J. Oostveen et al. propose a binary overall descriptor of an image for use in detecting copies of videos.

A first image is subdivided into rectangular blocks (e.g. 36 blocks of four rows by nine columns). A value is calculated in each of the blocks, such as for example the mean of the pixel luminances in the block.

Thereafter, the difference is calculated between the value obtained in a block and the value obtained in the following block on the same row. This produces 32 values, i.e. 4×8 values.

The same procedure is applied to the following image.

Thereafter, the difference is calculated between a value of the first image and the corresponding value of the following image. This produces 32 new values.

A 1 or a 0 is given to the descriptor depending on the sign of the difference as calculated in this way.

The above operations are repeated on the following pairs of images for a set of contiguous images in the video.

Thereafter, all of the descriptors (the 32 binary values in the above-mentioned example) are concatenated so as to form a final descriptor.

The drawback of such an overall descriptor is that its performance is poor in detecting copies of a video (or of an image or of a set of images) after being subjected to high levels of transformation as described above.

In the article entitled "Distinctive image features from scale-invariant keypoints", International Journal of Computer Vision, Vol. 60, No. 2, 2004, D. G. Lowe describes a descriptor defined by region of interest in an image and used for detecting copies of videos.

The descriptor is defined for a circular region of interest. The region is said to be "scale invariant" insofar as a change in image resolution does not change the overall content of the region of interest.

In order to calculate the descriptor of a region of interest, a square is defined that encompasses said region. The square is then subdivided into blocks.

In each block, a vector gradient is calculated for each pixel. The amplitude and the orientation for each of these vector gradients are then extracted. Thereafter, for each block, a histogram is drawn up of the orientations of the gradients, with the value of each orientation being weighted by the corresponding amplitude.

The descriptor for a region of interest is defined by concatenating the histograms obtained for the blocks making up a square that encompasses said region.

Such a descriptor is referred to as a scale invariant feature transform (SIFT).

The components of a SIFT descriptor are real numbers. Consequently, such a descriptor is more voluminous, more complex, and more difficult to use than a binary descriptor.

SUMMARY

In a first aspect, an embodiment of the present invention provides a method of determining a descriptor for a region of interest in an image, the method being characterized in that it comprises the steps of:
  defining a grid of points for the region of interest;
  associating a respective zone of influence with each point of the grid of points;
  determining a representative value for each point of the grid of points as a function of its respective zone of influence;
  comparing the representative value obtained for each point of the grid of points with at least one reference value determined from representative values of the points of the grid of points, the result of the comparison being expressed as at least one binary value; and
  concatenating the results obtained for the points of the grid in order to define a descriptor for the region of interest in the image.

The method of an embodiment of the invention makes it possible to define a descriptor for each region of interest of the image rather than an overall descriptor of the image. The descriptor that is obtained is thus robust in the face of transformations applied to the image overall.

Defining a grid of points for the region of interest and associating a respective zone of influence with each of these points serves to define a descriptor that is representative of the visual content of the region of interest.

Since the descriptor that is obtained is expressed as binary values, it is more compact, simpler, and easier to use.

According to a preferred characteristic, during the determining step, the representative value of a point of the grid of points is determined as a function of weighted values of data measured at the pixels of the image contained in the zone of influence of said point.

Thus, the descriptor of the region of interest is defined by taking account of all of the pertinent information contained in the region of interest of the image.

According to a preferred characteristic, the representative value of a point of the grid of points is equal to the weighted mean of the values of the data measured at the pixels of the image contained in the zone of influence of said point.

According to a preferred characteristic, the representative value of a point of the grid of points is equal to the weighted median value of the values of the data measured at the pixels of the image contained in the zone of influence of said point.

Thus, defining the descriptor from the mean or from the median value of the values for the data measured at the pixels represents a method that is simple and easy to put into place.

According to a preferred characteristic, the representative value of a point of the grid of points is determined by applying a method based on robust statistics.

Applying a method based on robust statistics makes it possible to attenuate or even to eliminate the effect of pixels for which the value of the measured data is too far removed from the representative value. Thus, the result that is obtained is not falsified by non-representative data.

According to a preferred characteristic, the above-described method as applied to an original image thus leads to an original descriptor being determined for a region of interest in the original image, and it includes an additional processing step comprising:
  transforming the original image to obtain a transformed image including a region of interest that is deduced from a region of interest in the original image as a function of the applied transformation;
  determining an additional descriptor for a region of interest in the transformed image from the original descriptor of the region of interest in the original image; and
  representing a region of interest in the original image and representing the corresponding region of interest in the transformed image by a single descriptor selected from the original descriptor and the additional descriptor.

By its construction, the descriptor takes into account transformations to which the image may be subjected, such as symmetry about a horizontal and/or vertical axis or luminance inversion. Thus, in use, it is more robust in the face of transformations of this type.

An embodiment of the invention also provides a device for determining a descriptor of a region of interest in an image, the device comprising means for:
  defining a grid of points for the region of interest;
  associating a respective zone of influence with each point of the grid of points;
  determining a representative value for each point of the grid of points as a function of its respective zone of influence;
  comparing the representative value obtained for each point of the grid of points with at least one reference value determined from representative values of the points of the grid of points, the result of the comparison being expressed as at least one binary value; and
  concatenating the results obtained for the points of the grid in order to define a descriptor for the region of interest in the image.

An embodiment of the invention also provides a computer program product including program code instructions recorded on or transmitted by a computer-readable medium for implementing the steps of the above-described method when said program is operating on a computer.

BRIEF DESCRIPTION OF THE DRAWINGS

Other characteristics and advantages appear from the following description of preferred implementations described with reference to the figures, in which.

DETAILED DESCRIPTION OF ILLUSTRATIVE EMBODIMENTS

In the description below, the multimedia content under consideration is an image, a set of images, or a video.

For a set of images or a video, the method of an embodiment of the invention is applied to the images taken into consideration independently from one another. The method may be applied to all of the images of a set of images or of a video, or to a subset thereof, referred to as "key" images.

Figure 1:
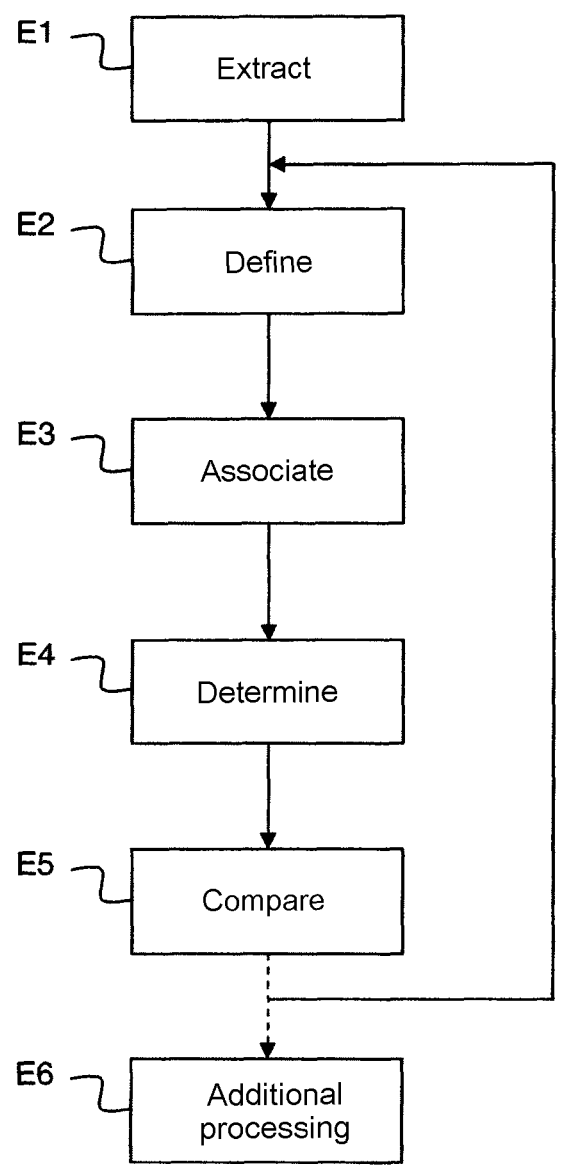
FIG. 1 represents an implementation of a descriptor-determination method for a region of interest in an image.

FIG. 1 represents an implementation of a descriptor-determination method for a region of interest in an image.

The method comprises a first step E1 of extracting regions of interest from an image.

The regions of interest of an image may be extracted using different region-of-interest detectors, including:

a difference of Gaussians detector (DOG);
a Fast-Hessian detector;
a maximally stable extremal regions (MSER) detector; and
a Harris detector.

The regions of interest that are extracted may be of any shape.

Starting from an extracted region of interest, a region of simple shape (e.g. circular, elliptical, square, rectangular, hexagonal, etc.) is defined that encompasses the region of interest.

The following steps E2 to E5 of the method of an embodiment of the invention apply to the regions of interest extracted during step E1.

These steps serve to determine one descriptor per region of interest in the image. The image is described by the set of descriptors obtained in this way for the regions of interest.

Step E2 is a step of defining a grid of points relative to a region of interest.

A grid of points is defined for a region of interest extracted during the preceding step E1 or for a region obtained by expanding a region of interest extracted during the preceding step E1, without shifting its barycentre.

The position of the grid of points corresponds to the position of the region of interest.

The size of the grid of points is proportional to the region of interest. A coefficient of proportionality between the grid and the region of interest is defined in such a manner that the grid of points covers the region of interest under consideration, and possibly extends beyond it. Thus, the coefficient of proportionality is slightly greater than 1 (e.g. of the order of 1.1 or 1.2).

Depending on the number of regions of interest and on their positions, they may overlap. The corresponding grids of points may likewise overlap.

The number and the distribution of the points of the grid are such that the immediate neighborhoods of the points (referred to as "zones of influence") encompass the pertinent information contained in the region of interest.

The distribution of points may be homogeneous or arbitrary.

The points of the grid and the barycenter of the region of interest do not necessarily coincide with the pixels of the image.

Figure 2:
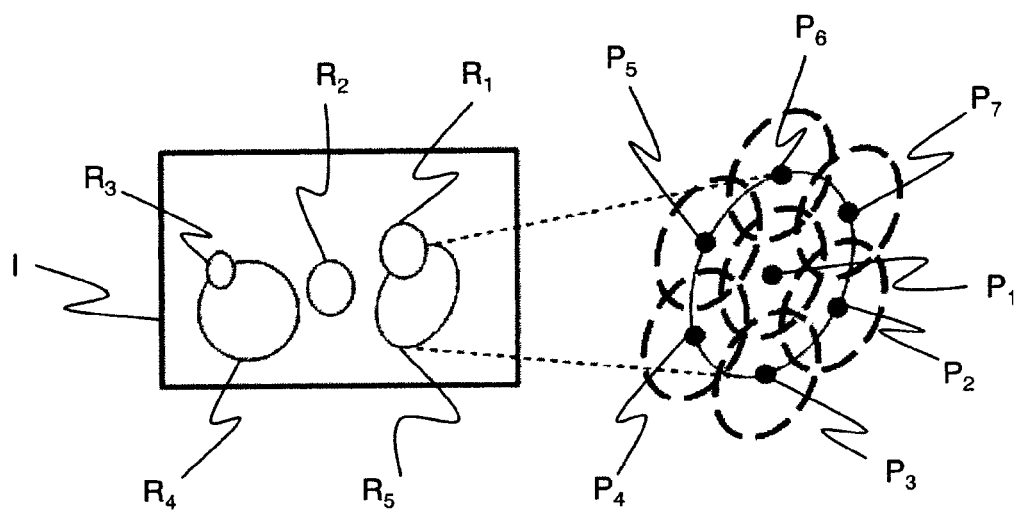
FIG. 2 shows a first example of defining a grid of points for a region of interest in an image.

FIG. 2 shows a first example of how a grid of points may be defined for a region of interest of an image.

The left-hand portion of FIG. 2 shows an image I that includes five regions of interest $R_1$ to $R_5$.

The right-hand portion of FIG. 2 shows a region of interest of the image I, specifically the region $R_5$.

The points $P_1$ to $P_7$ represent the points of the grid of points defined for the region of interest $R_5$.

These seven points are distributed in such a manner that the point $P_1$ is positioned at the barycenter of the region of interest $R_5$ and the points $P_2$ to $P_7$ represent the vertices of a regular hexagon in which the region of interest $R_5$ extracted from the image I is inscribed.

Figure 3:
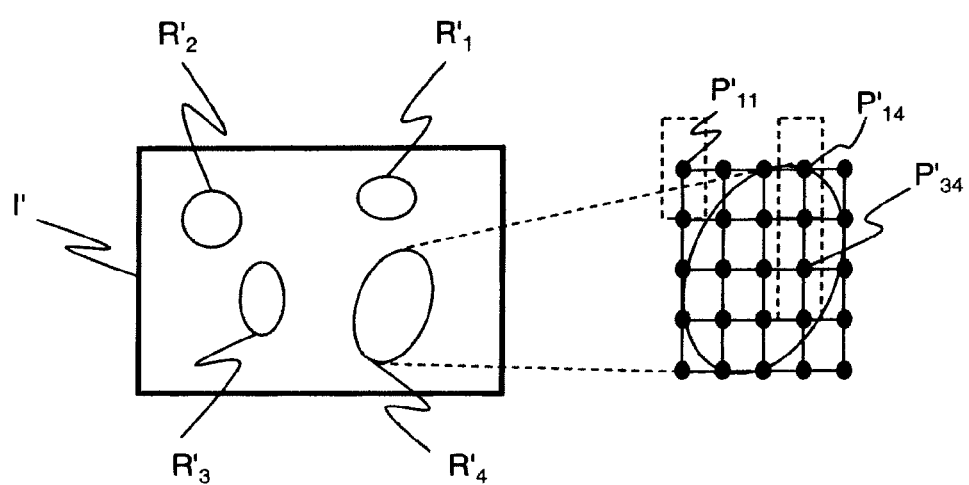
FIG. 3 shows a second example of defining a grid of points for a region of interest in an image.

FIG. 3 shows a second example of how a grid of points may be defined for a region of interest of an image.

The left-hand portion of FIG. 3 shows an image I' that has four regions of interest $R'_1$ to $R'_4$.

The right-hand portion of FIG. 3 shows a region of interest of the image I', specifically the region $R'_4$ having 25 points $P'_{ij}$ positioned thereon, where i and j both vary from 1 to 5, forming a rectangular grid having dimensions of 5×5 points.

To avoid overcrowding the figure, only the points $P'_{11}$, $P'_{14}$, and $P'_{34}$ are referenced.

During the following step E3, a zone of influence is associated with a point of the grid.

A zone of influence is a neighborhood of a point of the grid.

The zone of influence may have any shape.

Thus, with reference to FIG. 2, the zones of influence that are associated with the points $P_1$ to $P_7$ of the grid are elliptical. These zones of influence are represented by dashed-line ellipses surrounding the points $P_1$ to $P_7$.

In FIG. 3, the zones of influence associated with the 25 points of the grid are rectangles. These rectangles are represented by dashed lines drawn around the points $P'_{11}$, $P'_{14}$, and $P'_{34}$.

The zones of influence of different points of the grid of points may overlap.

The following step E4 is a step of determining a representative value for each point of the grid.

This representative value is determined from the values of data measured at the pixels contained in the zone of influence. By way of example, the measured data may be the luminance, the mean of the red, green, and blue (R, G, B) channels, the value of one of the channels, data derived from any colorimetric representation system, etc.

Thus, a pixel contained in the zone of influence of a point of the grid contributes to determining the representative value that is associated with that point.

A pixel may contribute to determining the representative value for a plurality of points of the grid. This can be seen in FIG. 2, where the zones of influence represented by dashed-line ellipses present regions of intersection. Thus, a pixel lying in such an intersection region contributes to determining representative values of points in each of the intersecting zones of influence.

The contribution of a pixel contained in the zone of influence of a point of the grid is weighted when determining the representative value of said point.

By way of example, the weighting may be defined as a function of the distance between the pixel and the point of the grid (central point or barycenter of the zone of influence).

Thus, by way of example, the representative value determined for a point of the grid may be equal to the weighted mean of the values of the measured data for the pixels contained in the zone of influence.

In a variant, the mean may be replaced by the median value of the set of values for the measured data for the pixels contained in the zone of influence.

In another variant, the representative value for a point of the grid may be determined on the basis of robust statistics, such as, for example, M-estimators, random sample consensus (RANSAC), etc.

This approach serves to reduce or even to eliminate the effect of pixels for which the value of the measured data is very far removed from the value that it is desired to determine. Taking account of the value of the measured data for such a pixel would run the risk of strongly affecting the result that is obtained.

Such an approach may require several iterations.

For example, the M-estimator method based on robust statistics may be applied with several iterations.

During the first iteration, a representative value is determined for a point of the grid on the basis of weighted values of data (e.g. the luminance) measured at the pixels contained in the zone of influence of that point. The weighting applied is a function of the distance between the pixel and the point under consideration in the grid.

During the following iteration, the weighting applied to the value of a pixel becomes a function of the difference between the representative value as determined during the preceding iteration for the point under consideration of the grid and the value of the data measured at that pixel.

The number of iterations is defined by observing a criterion that is representative of the dispersion of the measured data values around the determined representative value. By way of example, the criterion used may be the variance, the median value of the differences, etc. It is possible to decide to stop the iterations when two successive iterations give two results that are close to the representative value. It is also possible to predefine a determined number of iterations.

Figure 4:
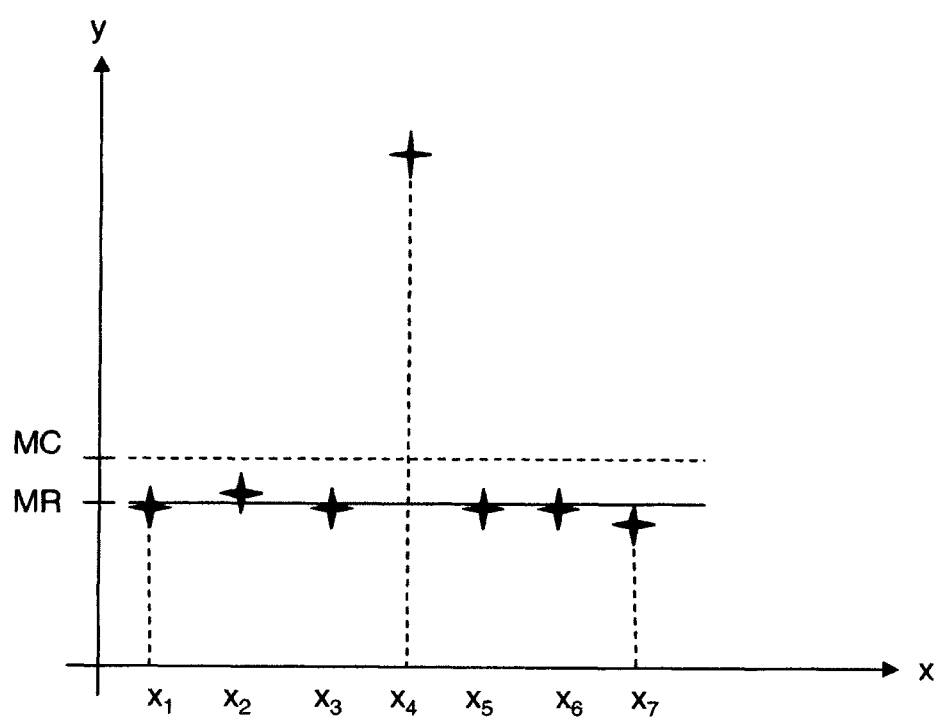
FIG. 4 shows an approach based on robust statistics applied to an embodiment of the invention.

FIG. 4 shows an approach based on robust statistics applied to an embodiment of the invention.

The x axis corresponds to the pixels of a zone of influence taken into account for determining the representative value of the grid point that corresponds to said zone.

Thus, FIG. 4 shows seven pixels $x_1$ to $x_7$.

The y axis corresponds to the values of the data measured at each of the pixels, and to the value that is representative of the grid point under consideration.

The pixel $x_4$ is the pixel for which the measured data value is very far removed from the values of the other pixels.

The effect of this pixel $x_4$ affects the representative value that is determined for the point, e.g. on the basis of the weighted mean of the values for the measured data of each of the pixels. A representative value MC is thus obtained for the grid point under consideration.

Determining the representative value for the point on the basis of robust statistics makes it possible to set aside the effect of this pixel $x_4$. A representative value MR is then obtained for the grid point under consideration, where MR is less than MC. Thus, the effect of that pixel is attenuated in the determination of the representative value of the point.

The purpose of such an approach is to obtain a descriptor for the region of interest under consideration that is less sensitive to transformations of the image.

Thus, with reference to FIG. 4, in order to modify the value of MC significantly, it would suffice to modify the value of the measured data for the pixel $x_4$, whereas in order to modify the value of MR significantly, it is necessary to modify the measured data values for several of the pixels.

For example, the luminance values of the pixels in a bright spot located in a dark zone can be strongly modified by changing the resolution of the image (or by some other transformation), while the values for the pixels in the dark zone are less affected by such a transformation. Such a transformation becomes imperceptible for a representative value that is determined by applying an approach based on robust statistics. Under such circumstances, the representative value is the value that is shared by a majority of the pixels.

Thus, the use of robust statistics makes it possible to obtain a descriptor that is more robust in the face of local transformations to the image under consideration.

At the end of step E4, a set of representative values is available, each of these representative values corresponding to a point of the grid that is defined for a region of interest.

During the following step E5, the representative values obtained during the preceding step E4 are compared with at least one reference value.

The order in which the points are processed and the order in which they are compared with at least one reference value may be arbitrary. Nevertheless, those orders must be the same throughout subsequent implementation of the method (for example, in order to determine the descriptors of a query content in order to detect copies).

By way of example, the at least one reference value may be the representative value determined for the central point of the grid, the mean of the representative values obtained for the points of the grid, etc.

In another example, the at least one reference value is calculated over a set of pixels that is different from that used for determining the representative value at a point of the grid. By way of example, such a set of pixels comprises the pixels contained in the zone of influence of a point of the grid together with a few neighboring points.

The result of the comparison is converted into binary values.

For example, if the representative value of a point of the grid is greater than the at least one reference value, then the result of the comparison is equal to 1.

Conversely, if the representative value of a point of the grid is less than the at least one reference value, then the result of the comparison is equal to 0.

The result of the comparison may be expressed on a larger number of binary values in order to refine the difference relative to the at least one reference value.

For example, if the representative value of a point of the grid is much greater, a little greater, a little less, or much less than the at least one reference value, then the result of the comparison may be equal respectively to 11, 10, 01, 00.

These examples are illustrative of an embodiment of the invention, but not limiting on the invention.

The binary values obtained in this way are concatenated in a predefined order. The result of this concatenation defines a descriptor for the region of interest under consideration in the image.

Since the descriptor is obtained by comparing the representative values of the points of the grid with at least one reference value, the descriptor is independent of overall variations in the region of interest under consideration due to transformations applied to the image.

Above, consideration is given to at least one reference value that is identical for all of the points of the image.

In a variant, it is possible to take into consideration at least one reference value that varies from one point of the grid to another.

In another variant, it is possible to take a plurality of reference values into consideration for a single point of the grid.

The above steps E2 to E5 of the method are then applied to the remaining regions of interest extracted during the step E1.

A descriptor is thus determined for each of the regions of interest extracted from the image. The image is described by the set of descriptors of the regions of interest as obtained in this way.

The method of an embodiment of the invention also includes an optional step E6 of performing additional processing.

This additional processing step serves to obtain a descriptor that is robust against simple transformations that may be applied to an original image that includes at least one region of interest.

A simple transformation is as applied a first time to an original image and then applied a second time to the resulting transformed image as obtained from the original image. This is an involution. By way of example, it might be an image that is symmetrical to the image about a horizontal and/or vertical axis, an inversion of luminance (a negative image), etc.

Prior to said step E6, descriptors are available for regions of interest of an original image as determined by applying above steps E2 to E5 of the method. These descriptors are referred to as original descriptors. As described above, these original descriptors are in the form of a string of binary values.

One or more simple transformations are applied to the original image (symmetrical images about a horizontal and/or vertical axis, luminance inversion, etc.).

Thereafter, the descriptors are determined for the regions of interest of the transformed image. Given the nature of the transformations that are applied, the regions of interest of the transformed image are not modified in shape or in size and can be deduced from the regions of interest in the original image as a function of the applied transformation (e.g. by symmetry if the transformation involved symmetry about a horizontal and/or vertical axis). Thus, a region of interest in the transformed image corresponds to a region of interest in the original image.

The term "additional" descriptors is used to designate descriptors for regions of interest in the transformed image.

An additional descriptor of a region of interest in the transformed image is obtained by permutating and/or taking the complement of certain binary values of the original descriptor of the corresponding region of interest in the original image. Thus, there is no need to apply above-described steps E2 to E5 in order to obtain an additional descriptor for a region of interest in a transformed image.

At the end of step E6, two descriptors are available, an original descriptor for a region of interest in the original image and an additional descriptor for the corresponding region of interest in the transformed image. Only one of them is retained (e.g. the smaller of the two) in order to represent both regions of interest under consideration.

In this way, a region of interest and the symmetrical region about a vertical and/or horizontal axis or a region of interest and the region that is inverted in terms of luminance, etc., have the same descriptor.

The number and the nature of the transformations that are applied to the original image are arbitrary. Nevertheless, they must be the same throughout the subsequent implementation of the method (e.g. when determining descriptors for a query content in order to detect copies).

Figure 5:
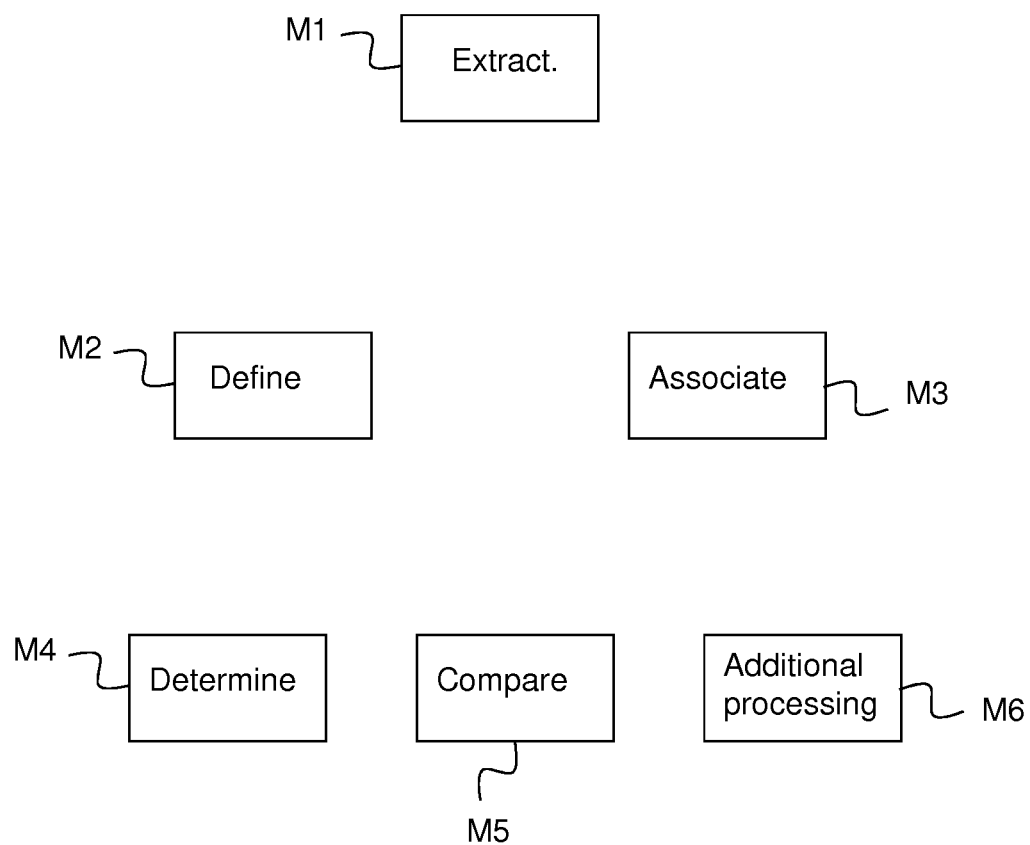
FIG. 5 represents an embodiment of a device suitable for implementing the method of FIG. 1.

FIG. 5 represents an embodiment of a device suitable for implementing a method as described above for determining a descriptor for a region of interest in an image.

The device comprises a module M1 for extracting regions of interest from an image.

The module M1 implements the step E1 as described above.

The device also includes a module M2 for defining a grid of points for a region of interest.

With reference to step E2, the module M2 serves to define a grid of points for a region of interest extracted by the module M1 or for a region obtained by expanding a region of interest as extracted by the module M1.

With reference to step E3, the module M3 is a module for associating a zone of influence with the points of the grid.

The device also includes a module M4 for determining a representative value for each point of the grid as described in step E4.

With reference to step E5, the device also includes a module M5 for comparing the representative values obtained at the output from the module M4 with at least one reference value.

The device also includes a module M6 for applying additional processing to an image, as described for step E6.

The device also includes a control unit (not shown) connected to each of the modules M1 to M6 and adapted to control their operation.

The modules M1 to M6 may be software modules forming a computer program. An embodiment of the invention thus also provides a computer program for a device for determining a descriptor of a region of interest in an image, the program including program code instructions for causing the device to execute the above-described method.

The various software modules may be stored in or transmitted by a data medium. The medium may be a hardware storage medium, e.g. a compact disk read-only memory (CD-ROM), a magnetic floppy disk, or a hard disk, or it may be a transmissible medium such as an electrical, optical, or radio signal.

An embodiment of the invention finds application particularly, but not exclusively, for sites for exchanging multimedia contents.

For example, an embodiment of the invention may be used to detect a plurality of copies of some given content stored on such a site. A given multimedia content may be stored several times over, each time with different designations (name, description, etc.). Implementing copy detection in a content search engine makes it possible to eliminate duplicates and to provide search results from which duplicates are eliminated.

Certain multimedia contents are protected by copyright. An embodiment of the invention also makes it possible to detect content illegally made available to the public on content exchange sites.

Although the present disclosure has been described with reference to one or more examples, workers skilled in the art will recognize that changes may be made in form and detail without departing from the scope of the disclosure and/or the appended claims.

The invention claimed is:

1. A method of determining a descriptor for a region of interest in an image, the method comprising the following steps, at least one of which being at least partially performed by a control unit of a device:

extracting the region of interest from the image;
   starting from the extracted region of interest, defining a region having a simple shape that covers completely the extracted region of interest;

defining a grid of points for the region of interest;
associating a respective predetermined zone of influence with each point of the grid of points, wherein the number and distribution of the points of the grid are such that the zones of influence cover completely the region having the simple shape;
determining a representative value for each point of the grid of points, the representative value for a particular point of the grid being determined from values of data measured at each pixel contained in that point's respective zone of influence;
comparing the representative value obtained for each point of the grid of points with at least one reference value determined from representative values of the points of the grid of points, the result of the comparison being expressed as at least one binary value; and
concatenating the results obtained for the points of the grid to define a descriptor for the region of interest in the image.

2. The method according to claim 1, wherein during the determining step, the representative value of the particular point of the grid of points is determined as a function of weighted values of data measured at pixels of the image contained in the zone of influence of said particular point.

3. The method according to claim 2, wherein the representative value of the particular point of the grid of points is equal to the weighted mean of the values of the data measured at the pixels of the image contained in the zone of influence of said particular point.

4. The method according to claim 2, wherein the representative value of the particular point of the grid of points is equal to the weighted median value of the values of the data measured at the pixels of the image contained in the zone of influence of said particular point.

5. The method according to claim 2, the representative value of the particular point of the grid of points is determined by applying a method based on robust statistics.

6. The method according to claim 1, applied to an original image and leading to an original descriptor being determined for a region of interest in the original image, the method further comprising an additional processing step comprising:
transforming the original image to obtain a transformed image including a region of interest that is deduced from a region of interest in the original image as a function of the applied transformation;
determining an additional descriptor for a region of interest in the transformed image from the original descriptor of the region of interest in the original image; and
representing a region of interest in the original image and representing the corresponding region of interest in the transformed image by a single descriptor selected from the original descriptor and the additional descriptor.

7. A device for determining a descriptor of a region of interest in an image, the device comprising:
a hardware storage medium storing computer-readable instructions; and
a control unit configured by the instructions to perform steps of:
extracting the region of interest from the image;
starting from the extracted region of interest, defining a region having a simple shape that covers completely the extracted region of interest;
defining a grid of points for the region of interest;
associating a respective predetermined zone of influence with each point of the grid of points, wherein the number and distribution of the points of the grid are such that the zones of influence cover completely the region having the simple shape;
determining a representative value for each point of the grid of points, the representative value for a particular point of the grid being determined from values of data measured at each pixel contained in that point's respective zone of influence;
comparing the representative value obtained for each point of the grid of points with at least one reference value determined from representative values of the points of the grid of points, the result of the comparison being expressed as at least one binary value; and
concatenating the results obtained for the points of the grid in order to define a descriptor for the region of interest in the image.

8. A hardware computer-readable medium comprising a computer program product recorded thereon and including program code instructions for implementing a method of determining a descriptor for a region of interest extracted from an image, when said program is operating on a computer, wherein the method comprises:
extracting the region of interest from the image;
starting from the extracted region of interest, defining a region having a simple shape that covers completely the extracted region of interest;
defining a grid of points for the region of interest;
associating a respective predetermined zone of influence with each point of the grid of points, wherein the number and distribution of the points of the grid are such that the zones of influence cover completely the region having the simple shape;
determining a representative value for each point of the grid of points, the representative value for a particular point of the grid being determined from values of data measured at each pixel contained in that point's respective zone of influence;
comparing the representative value obtained for each point of the grid of points with at least one reference value determined from representative values of the points of the grid of points, the result of the comparison being expressed as at least one binary value; and
concatenating the results obtained for the points of the grid to define a descriptor for the region of interest in the image.

* * * * *